United States Patent [19]

Rust, Jr.

[11] 3,844,869
[45] Oct. 29, 1974

[54] APPARATUS FOR ULTRASONIC WELDING OF SHEET MATERIALS
[75] Inventor: Edgar C. Rust, Jr., Williamstown, Mass.
[73] Assignee: Crompton & Knowles Corporation, New York, N.Y.
[22] Filed: Dec. 20, 1972
[21] Appl. No.: 316,801

[52] U.S. Cl................ 156/358, 156/73, 156/360, 156/380, 156/582
[51] Int. Cl............................................ B32b 31/00
[58] Field of Search.... 156/219, 220, 209, 272–274, 156/358, 359, 360, 380, 580, 581, 582, 73, 290, 292

[56] References Cited
UNITED STATES PATENTS
3,562,041  2/1971  Robertson.............................. 156/73
3,733,238  5/1973  Long et al.......................... 156/73 X Primary Examiner—Charles E. Van Horn
Assistant Examiner—David A. Simmons

[57] ABSTRACT

An apparatus for joining sheets of thermoplastic material by ultrasonic vibration welding in which the welds are formed between the working surface of an ultrasonic resonator and opposing surfaces of anvils arranged in a changing pattern; means are disclosed for modifying the total energy transmitted by the resonator to the portions of the sheet material between the resonator and anvils so that the amount of energy is greater for a higher total surface area and less for a lower total surface area of the opposing surfaces of the anvils.

9 Claims, 7 Drawing Figures 3,844,869

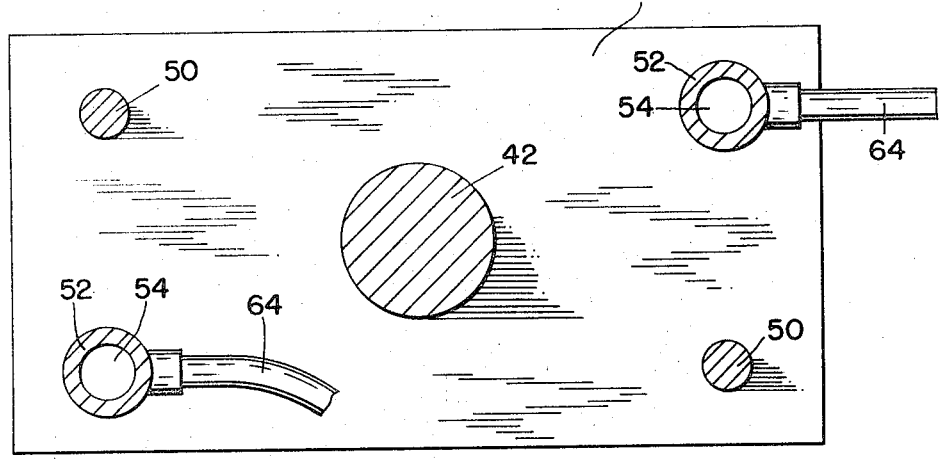
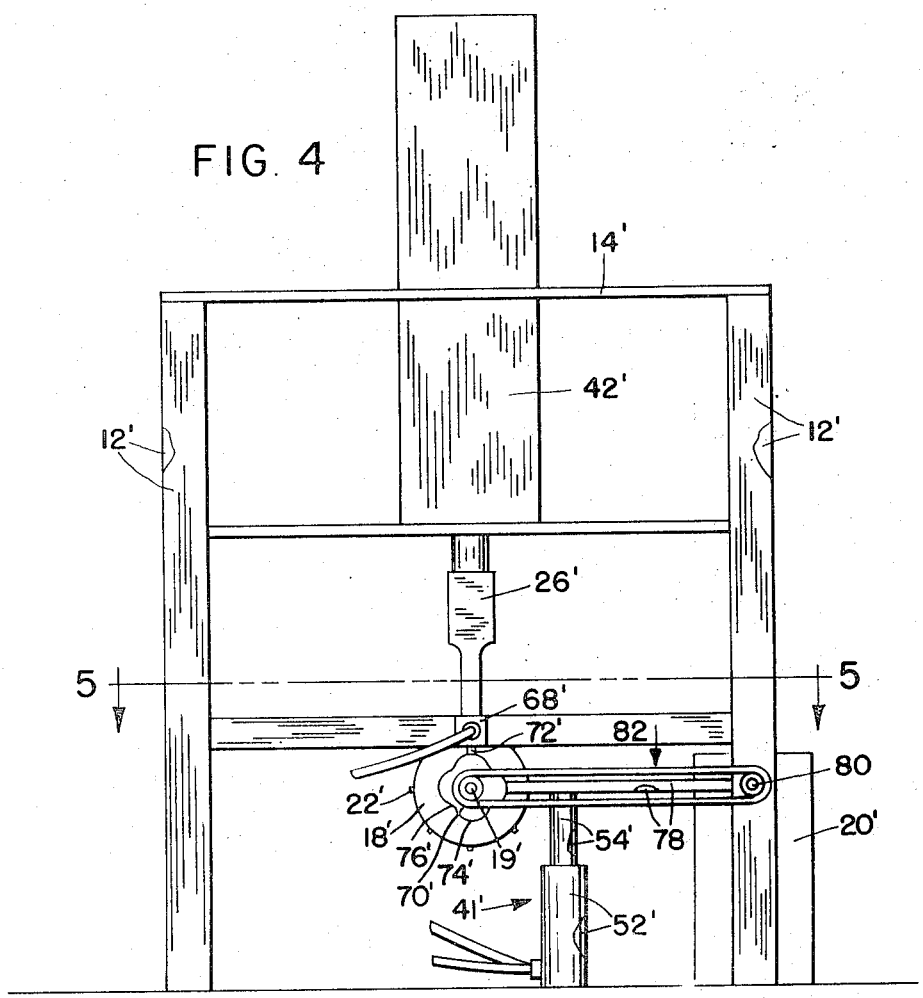

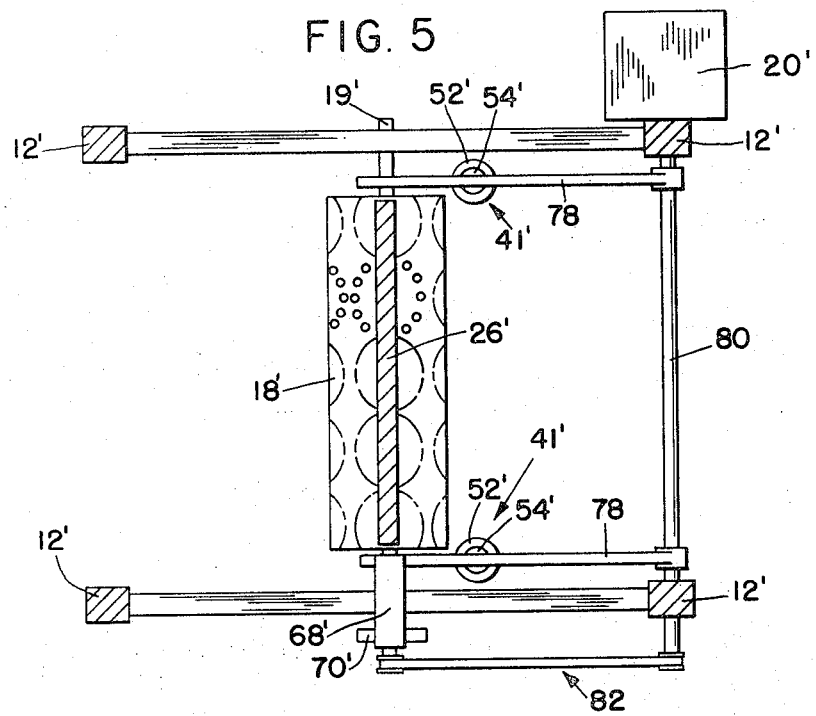
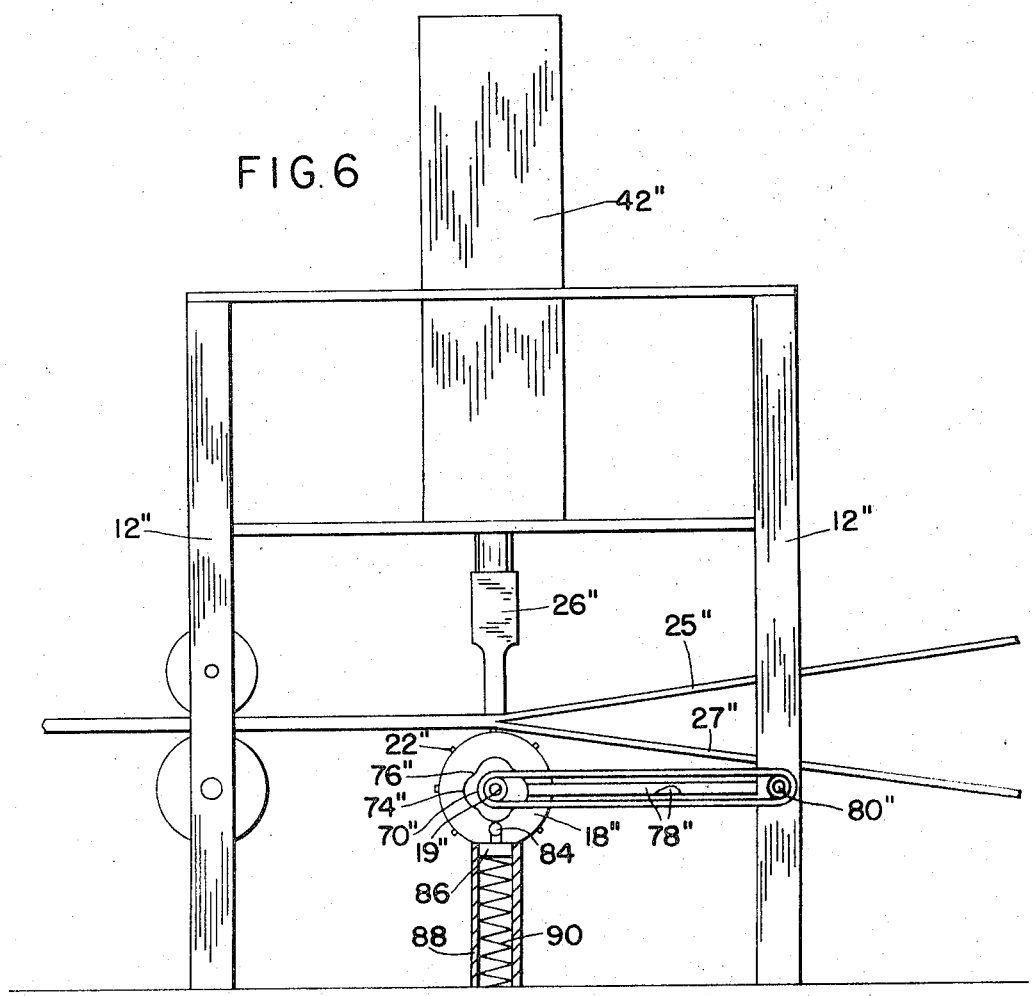

APPARATUS FOR ULTRASONIC WELDING OF SHEET MATERIALS

BACKGROUND OF THE INVENTION

This invention relates to mechanism for welding thermoplastic sheet material in a pattern by means of ultrasonic vibration equipment. The welded sheet may be used for such products as: upholstery material, blankets, table covers, sleeping bags, and many other articles.

This invention represents an improvement over my previous U.S. application Ser. No. 289,508, filed Sept. 15, 1972 and U.S. application 207,322, filed Dec. 13, 1971 jointly with Delmar D. Long and Stanley L. Lawrence, now U.S. Pat. No. 3,733,238, dated 5/15/73. These two applications disclose means for pattern welding thermoplastic sheets. The welding pattern is determined by the surfaces of the anvils which are opposed to the "working" surface of the resonator or vibration transmitting member. For many of the patterns which are commonly used, the number of anvils in opposition to the vibration transmitting member or resonator will vary. This means that the total opposing surface area of the anvils will vary during the course of operation of the apparatus. To obtain proper welds in the sheet material, the resonator must compress the material against the anvils and transmit a certain amount of energy per unit area of opposing anvil surface. If too much energy is transmitted, holes will be formed in the material instead of weld spots and if not enough energy is transmitted, the welds may be insufficient to hold the sheets together. If the total energy transmitted from the resonator to the thermoplastic sheets is ideal for proper welding of a specified total opposing surface area for the anvils, too much energy will be transmitted for some of the sparser portions of the anvil pattern which may create holes in the sheets and too little energy will be transmitted for the denser anvil sections which may create insufficient welds. One solution to the problem would be to provide anvil patterns which have uniform anvil opposing surface density but this severely restricts patterning possibilities.

SUMMARY OF THE INVENTION

The present invention has for its primary object the provision of apparatus for producing uniform welds in sheets of thermoplastic material for anvil patterns which include varying anvil densities.

The object of the invention is accomplished by providing means for modifying the total energy transmitted by the resonator to the thermoplastic sheets. Means are provided which increase the transmittal of energy with an increase in total opposing surface area of the anvils and decrease the transmittal of energy with a decrease in total opposing surface area of the anvils during operation of the apparatus.

BRIEF DESCRIPTION OF THE DRAWINGS

FIG. 3 is a horizontal section taken along line 3—3 of FIG. 1;

FIG. 4 illustrates a first modification wherein the modifying force is applied through the anvil roll;

FIG. 5 is a horizontal section taken along line 5—5 of FIG. 4;

FIG. 6 represents a second modification showing a variation of force modifying means.

DETAILED DESCRIPTION OF THE INVENTION

Figure 1:
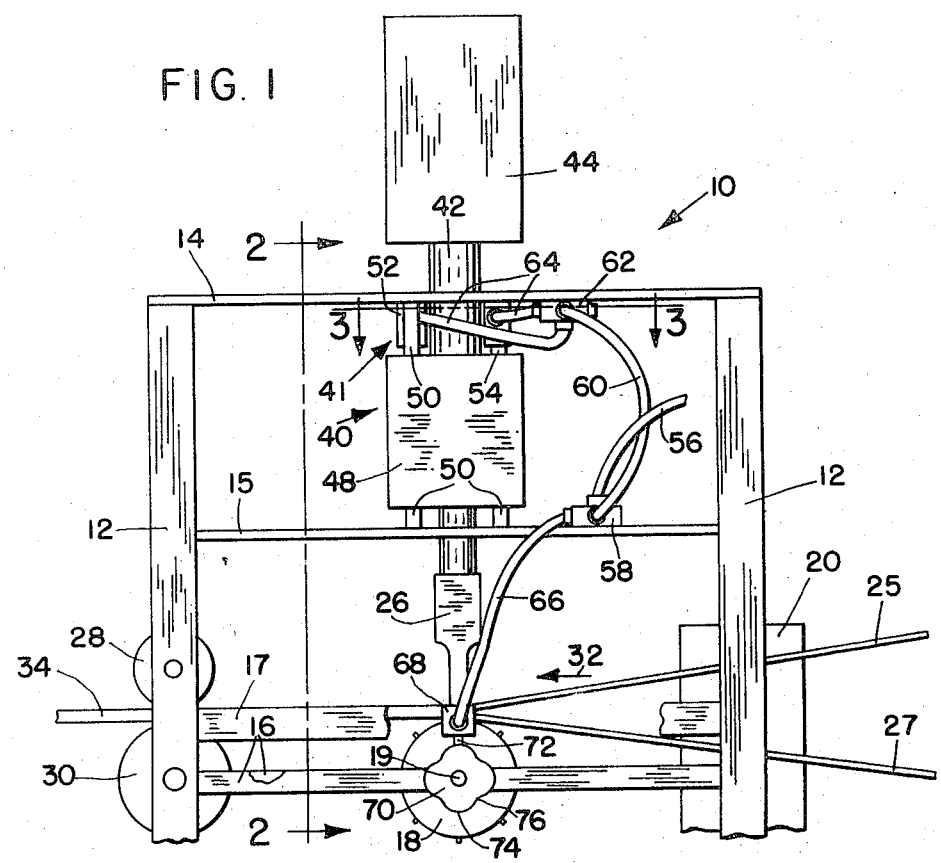
FIG. 1 is a side elevation of ultrasonic welding apparatus embodying the present invention.
Figure 2:
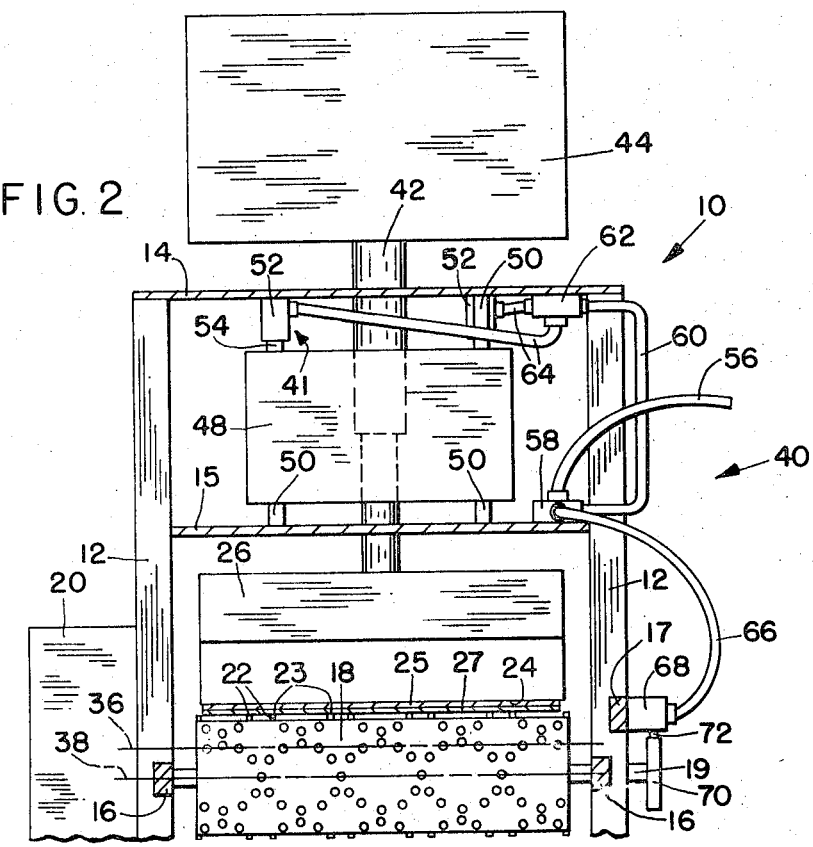
FIG. 2 is a vertical section taken along line 2—2 of FIG. 1.

Referring to the FIGS. 1-3, the ultrasonic welding apparatus is generally indicated by the reference numeral 10 and comprises upright frame members 12 for supporting horizontal frame members 14, 15, 16 and 17. A roll 18 is mounted on a shaft 19 for rotation within frame members 16 and is rotatably driven by conventional means, not shown, within a casing 20. There is a plurality of projections or anvils 22 extending from the surface of roll 18 which have outer surfaces 23. These surfaces cooperate with working surface 24 of an ultrasonic vibration transmitting member or resonator 26 located just above the roll. The sheetlike elements to be joined are indicated at 25 and 27 and drawn between roll 18 and resonator 26 by feed rolls 28 and 30 driven in timed relation with roll 18 from a source of supply, not shown.

Anvils 22 are arranged on roll 18 in a pattern, see FIG. 2. As roll 18 rotates and sheets 25 and 27 are advanced in the direction of arrow 32, the surfaces 23 cooperate with surface 24 of resonator 26 to form weld spots in the same pattern as the roll on the sheets 25 and 27 to unite them as a finished product indicated at 34. The particular pattern of anvils shown on roll 18 in FIG. 2 is only an example of the many patterns which may be used wherein there are variations in anvil density along lines extending across the surface of the roll and parallel to the rotational axis thereof. For example, there are more anvils along dot and dash line 36 than dot and dash line 38 in FIG. 2. In areas where there is a greater anvil density the total contact area between the anvils and surface 24 is also greater.

The means for modifying the total energy transmitted to the sheets 25 and 27 between surfaces 23 and 24 are generally indicated by the reference numeral 40 and includes fluid pressure actuators 41. Resonator 26 is connected to an ultrasonic electro-acoustic converter or transducer 42 which extends from an electrical box 44, extends freely through frame members 14 and 15 and is fixed to casing 48. Converter 42 may be of the type described, for example, in U.S. Pat. No. 3,328,610 issued to S. E. Jacke et al., dated June 27, 1967, entitled "Sonic Wave Generator." Casing 48 is slidably mounted on diagonally positioned vertical guide rods 50 which are fixed between frame members 14 and 15. Actuators 41 each comprise an air cylinder 52 and a piston 54 slidable therein. Cylinders 52 are fixed to member 14 and pistons 54 engage the upper corners of casing 48 which are unoccupied by guide rods 50, see FIG. 3.

Cylinders 52 are maintained pressurized by air from a source of pressurized air, not shown. Pressurized air from this source is supplied through a line 56 into a fixture 58 and then through a line 60 to another fixture 62 which divides the flow of air into two branch lines 64 for connection to cylinders 52. An air line 66 is also connected to fixture 58 and to a modulating bleeder valve 68 mounted on frame member 17. A cam 70 is fastened to an end portion of shaft 19 which extends beyond the frame 12. Valve 68 includes a plunger 72 which is engaged by cam 70, the position of which controls the amount of air which is bled from fixture 58. The rate of bleeding from fixture 58 will affect the air pressure to cylinders 52 and therefore the amount of force exerted by the pistons 54 against member 26. Cam 70 has high portions 74 and low portions 76 which are designed to correlate with the anvil density on the roll 18. When an area of low anvil density is aligned with the surface 24 of resonator 26, plunger 72 will be engaged by a high portion 74 of cam 70 to produce maximum bleeding from valve 68 and reduce the force exerted by resonator 26 against the sheets 25 and 27 and thereby decrease the amount of energy transmitted by the resonator to the sheets. When an area of high anvil density is aligned with the surface 24 of resonator 26, plunger 72 will be engaged by a low portion 76 of cam 70 to produce minimum bleeding from valve 68 to increase the force exerted by resonator 26 against the sheets 25 and 27 and thereby increase the amount of energy transmitted by the resonator to the sheets. The surface area of cam 70 between extreme high and low portions are designed to operate valve 68 so that the energy transmitted by resonator 26 to the sheets will be proportional to the anvil densities of those portions of the roll 18 which are between the high and low density areas represented by dot and dash lines 36 and 38.

For some patterns a modulating valve may not be needed in which cases it may be enough to employ an "on-off valve" in combination with a cam which causes the valve to bleed only when the anvil density drops below a predetermined value to reduce the pressure in the actuators 41.

If desired, the pneumatic system described above could be replaced by one which utilizes a pressure regulator valve connected between the source of pressurized air and the actuators 41 and which can be controlled directly from cam 70 by means of a follower or plunger forming part of the regulator valve.

Referring to FIG. 4, there is shown a modification wherein a vibration transmitting member or resonator 26' is supported from a transducer or converter 42' which is fixed to a frame member 14' and restrained against vertical movement. A pattern roll indicated at 18' is mounted for movement toward and away from vibration transmitting member 26'. Roll 18' is mounted on a shaft 19' which is supported by a pair of arms 78 pivotally supported on a shaft 80 which is mounted between two frame members 12'. Shaft 80 is rotatably driven by conventional drive means, not shown, from within a casing 20'. Shaft 19' is rotatably driven from shaft 80 by means of a chain and sprocket drive generally indicated at 82. A cam 70' is fixed to shaft 19' and engages a plunger 72' of a modulating valve 68'. Cam 70' and valve 68' control the pressure within a pair of pressure actuators 41' through air connections, not shown, in the same manner as actuators 41 are controlled by cam 70 and valve 68. Actuators 41' comprise pistons 54' slidable within cylinders 52'. Actuators 41' engage the lower sides of arms 78 and force anvils 22' on roll 18' against the sheet-like elements to be joined in opposition to the vibration transmitting member 26'. Cam 70' has high portions 74' and low portions 76' which correlate with the anvil density pattern of roll 18' so that the pressure within cylinders 52' increases with greater anvil density and decreases with less anvil density.

It is contemplated that a hydraulic system could also be used instead of the pneumatic system which has been disclosed.

The force applied to either the resonator or anvil roll may be modified by mechanical means directly from a cam fastened to the anvil shaft as shown, for example, in FIG. 6. Referring to FIG. 6, a vibration transmitting member or resonator 26" is supported from a converter 42" which is fixed against vertical movement as in the embodyment shown in FIGS. 4 and 5. An anvil roll 18" is mounted on a shaft 19" which is supported between a pair of arms 78" pivotally mounted on a shaft 80" which extends between frame members 12". Shaft 19" is driven from shaft 80" in the same manner as shaft 19' in the embodiment of FIGS. 4 and 5. A cam 70" similar to cam 70' is mounted on shaft 19" and engages a follower 84 which is connected to a plunger 86 slidingly mounted within a casing 88. A heavy spring 90 acts on plunger 86 to urge follower 84 against cam 70" and forces anvils 22" against the sheet-like element 25" and 27" in opposition to resonator 26". Cam 70" has high areas 74" and low areas 76" which are designed so that the high areas 74" will depress spring 90 and thereby increase the force urging the anvils against the sheet-like elements 25" and 27". The low areas 76" allow the spring 90 to expand or "relax" thereby reducing the force of the anvils against the sheet-like elements when the anvil density is low.

Figure 7:
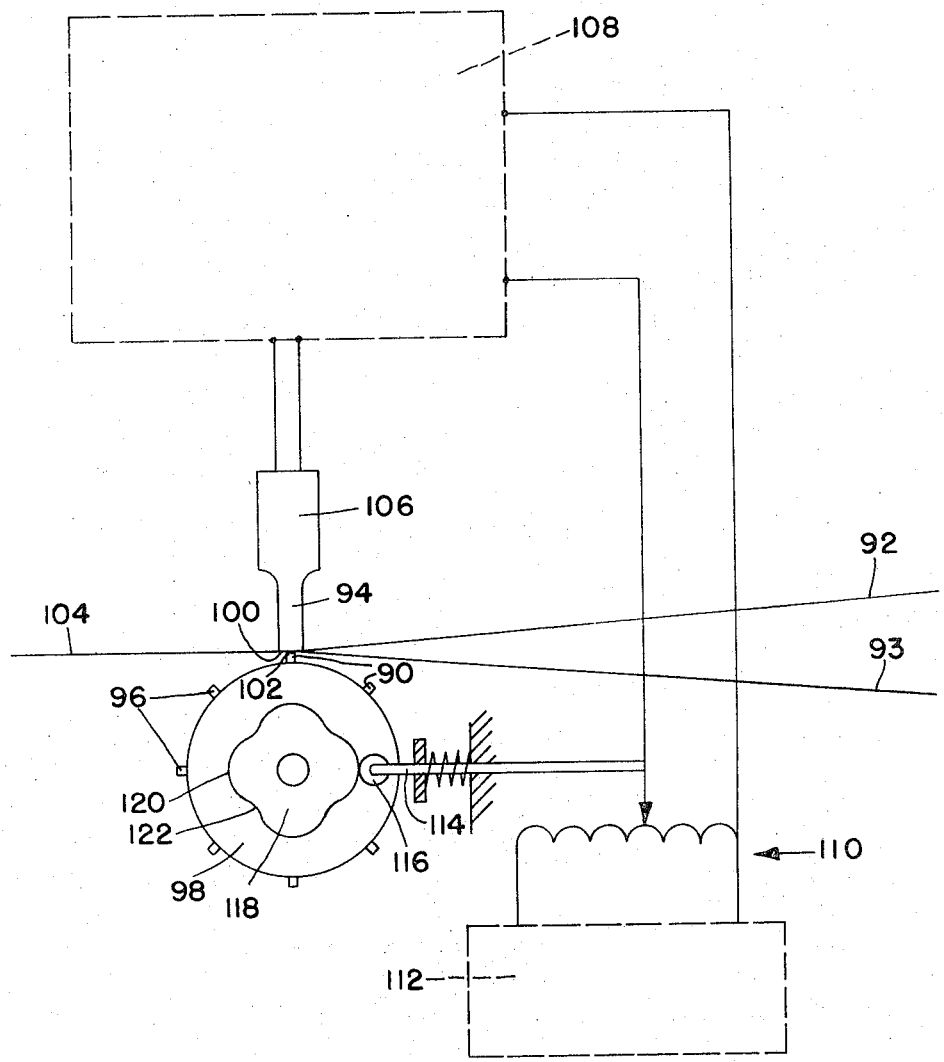
FIG. 7 is a diagramatic view of a further modification where the transmittal of energy is modified electrically.

Referring to FIG. 7, there is shown a still further modification wherein the amount of energy transmitted to the thermoplastic sheets is controlled electrically. The sheets to be welded are indicated at 92 and 93 and are passed between a resonator 94 and anvils 96 which are mounted on a rotating roll 98. Anvils 96 are arranged in a pattern of the surface of the roll 98 in a manner similar to that for roll 18 and roll 98 is driven in timed relation with mechanism, not shown, for feeding sheets 92 and 93. Resonator 94 has a working surface 100 which cooperates with opposing surfaces 102 of anvils 96 to produce welds in sheets 92 and 93 as they pass therebetween to produce the finished product indicated at 104. Resonator 94 is connected to a converter 106 which in turn is connected to an electrical control circuit indicated at 108. The converter 106 provides mechanical output energy in response to applied high frequency electrical energy. The amount of energy transmitted from the resonator 94 to the sheets is varied by varying the velocity of the resonator. This velocity can be controlled electrically by varying the input voltage to the circuit 108. Circuits suitable for this purpose are disclosed in U.S. Pat. No. 3,443,130 to Andrew Shoh, dated May 6, 1969 entitled "Apparatus for Limiting the Motional Amplitude of an Ultrasonic Transducer" and U.S. Pat. No. 3,666,599 to Edward G. Obeda, dated May 30, 1972 and entitled "Sonic or Ultrasonic Seaming Apparatus."

The voltage to circuit 108 can be controlled by an adjustable transformer 110 which is connected between circuit 108 and a power source indicated at 112. Transformer 110 is on the type which includes a movable tap 114 whose position will determine the voltage to circuit 108. Tap 114 is connected to a follower 116 which is engaged by a cam 118 which rotates with roll 98. Cam 118 has high portions 120 and low portions 122 which correlate with the anvil density on roll 98. When the anvil density decreases, tap 114 will be shifted in a first direction which decreases the voltage to circuit 108 and when the anvil density increases, tap 114 will be shifted in a second direction to increase the voltage to circuit 108.

I claim:

1. Apparatus for joining two or more sheets, at least one of which contains a thermoplastic material, comprising:
   a. an ultrasonic electro-acoustic converter;
   b. a resonator connected to said converter and having a working surface;
   c. anvil means having surfaces for opposing and cooperating with said working surface so that energy will be transmitted to said sheets by said resonator for producing welds in those portions of said sheets placed between said working surface and said opposing surfaces, wherein the total surface area of said opposing surfaces varies during operation of said apparatus;
   d. means for advancing the sheet-like elements to be joined between said resonator and said anvil means in contact with said working surface and said opposing surfaces;
   e. means for modifying the total amount of energy transmitted by the resonator to said sheets; and
   f. control means operatively connectd to said modifying means so that energy will be transmitted by said resonator to said sheets at at least two different rates, a relatively high rate for a relatively high total surface area of said opposing surfaces and a relatively low rate for a relatively low total surface area of said opposing surfaces.

2. The apparatus as described in claim 1 wherein said modifying means comprises a fluid pressure actuator for urging said resonator toward said anvil means and said control means comprises means for modifying the pressure of said actuator.

3. The apparatus as described in claim 2 wherein said control means comprises:
   a. a pressure control valve operatively connected to said actuator; and
   b. cam means for actuating said control valve.

4. The apparatus as described in claim 1 wherein said modifying means comprises a source of electrical energy coupled to said converter for energizing said converter and causing said resonator to resonate at a velocity determined by the electrical signal applied to said converter, and said control means comprises means for controlling the signal applied to said converter.

5. The apparatus as described in claim 1 wherein said control means are effective to control said modifying means so that the energy transmitted by said resonator to said sheets is at a rate which is proportional to the total surface area of said opposing surfaces.

6. The apparatus as described in claim 5 wherein said modifying means comprises a fluid pressure actuator for urging said resonator toward said anvil means and said control means comprises means for modifying the pressure of said actuator.

7. The apparatus as described in claim 6 wherein said control means comprises:
   a. a modulating pressure control valve operatively connected to said actuator; and
   b. cam means for actuating said control means.

8. The apparatus as described in claim 2 wherein said modifying means comprises a source of electrical energy coupled to said converter for energizing said converter and causing said resonator to resonate at a velocity determined by the electrical signal applied to said converter, and said control means comprises means for controlling the signal applied to said converter.

9. The apparatus as described in claim 8 wherein said control means comprises:
   a. an adjustable transformer including a movable tap which is effective to vary the signal applied to said converter; and
   b. a cam for moving said tap.

* * * * *